Patented Apr. 12, 1938

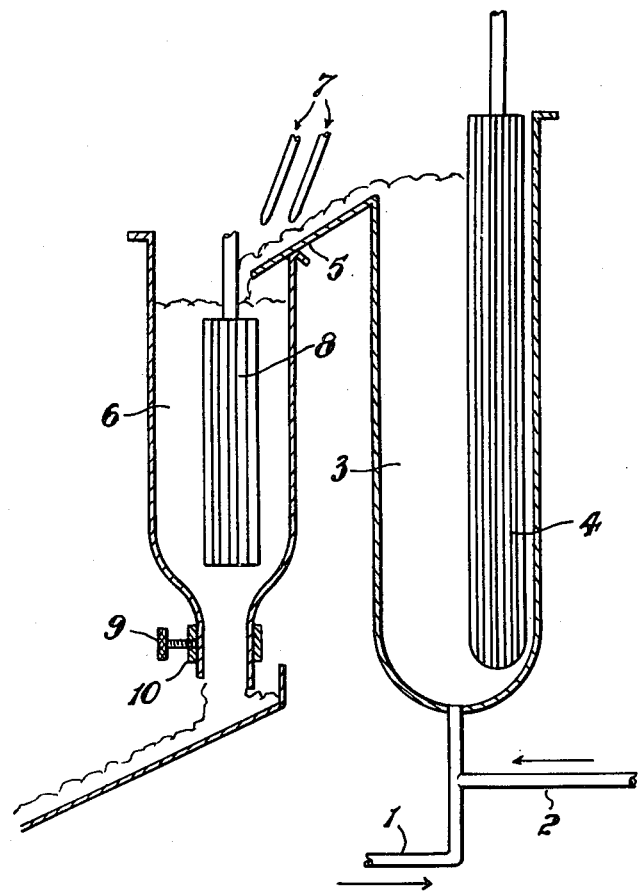

2,114,275

UNITED STATES PATENT OFFICE 2,114,275

PROCESS FOR PRODUCING FOAM FROM AQUEOUS DISPERSIONS OF RUBBER

Edward Arthur Murphy and Evelyn William Madge, Wylde Green, Birmingham, Stanley Douglas Taylor, Sutton Coldfield, and Donald Whitworth Pounder, Moseley, Birmingham, England, assignors to Dunlop Rubber Company Limited, London, England, a British company Application March 19, 1937, Serial No. 131,884
In Great Britain March 11, 1936

2 Claims. (Cl. 18—50)

This invention relates to a process and apparatus for the production of reversible foams from aqueous dispersions of rubber. Hitherto the processes and the apparatus employed for this purpose have led to the formation of container-scrap, did not permit the degree of control necessary to allow the production of foams of predetermined density, and gave rise to the possibility of inaccuracies with respect to the admixture of various ingredients.

The object of the present invention is to provide a process and an apparatus which overcome or eliminate such difficulties and thus permit the production of reversible foams of predetermined characteristics from aqueous dispersions of rubber.

It has now been found that improved results are obtained by producing reversible foams from rubber latex in a continuous manner.

According to the present invention the process which permits the production of reversible foams of predetermined characteristics from aqueous dispersions of rubber in a continuous manner comprises introducing an aqueous dispersion of rubber and a gas concurrently into a receptacle provided with the necessary foaming mechanism, forming an intimate admixture of the aqueous dispersion of rubber and the gas and permitting the intimate admixture to leave the receptacle.

Preferably the aqueous dispersion of rubber and the gas concurrently introduced into the receptacle have a desired volume-ratio.

If desired substances, e. g., capable of modifying the aqueous dispersions of rubber employed, may be admixed with the aqueous dispersions of rubber prior, during or subsequent to the formation of the reversible foam. It may be desirable to introduce some substances at one stage and some at another. Some of the additional substances may be fed at a suitable rate on to the surface of the foam as it leaves the aforesaid receptacle, the foam being then passed through another receptacle provided with the mechanism necessary to effect a thorough admixture of the additional substances with the foam.

The aqueous dispersions employed comprise those consisting of or containing rubber, guttapercha, balata or similar vegetable resins occurring naturally or artificially obtained, and in a vulcanized or unvulcanized condition. Aqueous dispersions of coagulated rubber, vulcanized rubber, synthetic rubber, waste or reclaim may also be employed if desired as alternatives or admixtures.

Any of the aforesaid dispersions may contain the usual known compounding ingredients.

Concentrates such as are obtained in Patent 1,846,164 and in British Patent No. 219,635 to which may be added any one or more of the usual compounding ingredients, preferably excepting those which would tend to form insoluble soaps or to increase the surface tension of the foam may also be employed. Any one or more of the compounding ingredients may be incorporated with the aqueous dispersions of rubber, e. g., by introducing them at a controlled rate, either before, during or at the completion of the admixture of the gas.

Also, working in accordance with the present invention reversible foams may be produced without the special addition of lather-forming substances, but the use of such materials is found to be advantageous. Examples of such materials are soap and soap-forming ingredients. Such materials may be added to the main supply of aqueous dispersion of rubber or they may be introduced at a controlled rate continuously into the dispersion either before or during the foaming operation.

The substances capable of modifying the aqueous dispersions of rubber which may be admixed therewith may be setting or gelling agents in the form of dispersions or solutions; stabilizers such as casein, the caustic alkalies, or alternatively substances capable of reducing the ammonia content such as formaldehyde; substances capable of generating gases by chemical action.

The gas employed for admixing with the aqueous dispersion may be air, or may comprise a mixture of gases, or may contain vapours capable of modifying the aqueous dispersion, the foam produced or the irreversible spongy or cellular material obtained after setting. Such vapours may comprise formaldehyde, vapourized solvents.

The apparatus preferably employed for carrying out the process according to the invention comprises in combination, a receptacle provided with a foaming mechanism as well as one or more inlets in the vicinity of the base and an outlet at the top, means for controlling the supply of liquid, and means for controlling the supply of gas.

The receptacle provided with the foaming mechanism is preferably cylindrical in form and shaped at the base to a stream-line form to permit smooth flow of the fluid introduced.

The foaming mechanism within the receptacle may comprise a wire cage rotating axially within the receptacle or frothing chamber and separated from it by a narrow annular gap, or rotating metal cylinder with wires projecting from it and concentric with the frothing chamber. The wires may be vertical in form and may intermesh with similar wires fixed to and projecting from the sides of the frothing chamber.

In a preferred form the foaming mechanism comprises cylindrically arranged wires which are made to rotate with "sun and planet" motion normal to the axis of the frothing chamber. The rotating member extends above the outlet for the issuing foam, and preferably carries fins at its upper end to prevent the entrance of air from the atmosphere.

The means for measuring the rate of delivery of gas into the receptacle preferably consists of a flow meter.

The apparatus according to the invention can also comprise in combination one or more additional pumping systems and alternatively or additionally one or more flow meters, irrespective of the flow meter which may be used to measure the rate of delivery of gas into the receptacle. The receptacle provided with the foaming mechanism can be provided at its outlet with a chute leading into a mixing chamber. A number of jets connected to various supply tanks may be so arranged as to be able to deliver liquids at controlled rates on to the chute.

The aqueous dispersion is ejected from the supply tank by inflowing air, the rate of which is measured by a flow meter which is used to control the supply of dispersion to the frothing chamber at a predetermined rate.

The aqueous dispersion and the gas are introduced preferably at the base of the frothing chamber in controlled volume-ratios. The controlled supply of gas enters the base of the frothing chamber through a detachable jet. The controlled supply of aqueous dispersion preferably enters the gas stream just before the latter enters the frothing chamber. A coarse foam is produced as the mixture of air and aqueous dispersion becomes acted upon by the lower part of the rotating member which progressively reduces the size of the gas bubbles in their upward passage through the frothing chamber thereby producing a fine foam which is finally ejected at the upper end of the frothing chamber. The volume-ratio of the gas to the aqueous dispersion determines the required density of the issuing foam.

When it is desired to introduce a gelling agent or other substances into the foam, the foaming mechanism or rotating member used may be free from wires near its centre and provided in this gap with a cone of solid metal fixed so that its apex points upwards. The jet stream is made to impinge on the upper part of the surface of the cone in such a way that the gelling agents or other substances become uniformly distributed throughout the rising mass of foam. Such substances may be injected into the frothing chamber in controlled manner by direct pumping.

A preferred manner of introducing auxiliary agents such as zinc oxide and gelling agents such as sodium silicofluoride is described by way of example as follows with the aid of the accompanying diagrammatic drawing.

A latex mixing of predetermined composition is supplied from a tank at a controlled rate of flow through a pipe 2 to the cylindrical foaming chamber 3 of 18 litres capacity, provided with a rotating member 4. A controlled flow of air is delivered into the frothing chamber through the pipe 1. The air and latex mixing are admixed by the action of the rotating member 4, the speed of which is approximately 200 revs. per minute, and converted into a fine foam as the mixture rises in the frothing chamber 3. As the action of this rotating member 4 is largely a comminuting one the coarseness of the bubbles in the froth is dependent among other things on this speed. The foam overflows down a chute 5 into a mixing chamber 6. The rotating member 4 extends beyond the surface of the issuing foam. The auxiliary agents are introduced into the foam by feeding them at controlled rates through any desired number of delivery tubes 7, 7 on to the surface of the foam as it passes down the chute. The mixing of the auxiliary agents and the foam is effected in the mixing chamber 6 by means of a simple whip 8, preferably executing "sun and planet" motion. The time of mixing is governed by the level maintained in the container 6. The level of the foam is controlled by the adjustable clamp 9 closing on a rubber tube 10 attached to the base of the container 6.

In producing a fine foam having a volume-ratio of air to latex mixing of five to one from a latex mixing of 54 per cent solid content the above machine is capable of an output of 1.6 kilograms dry weight per minute or in other words of 18 litres of foam per minute. The time of passage through the frothing chamber is about one minute and where the auxiliary mixing chamber is used the time of passage through this is approximately ½ minute.

Typical injection speeds of auxiliary agents which are introduced by pumping are soap solution 36 ccs. per minute, gelling agent 60 ccs. per minute, zinc oxide dispersion 100 ccs. per minute.

Using a machine of the size described a hundred gallons of froth of the above composition would be produced in 25 minutes. In the discontinuous process using an 80 quart bowl the total frothing time required to produce 100 gallons of a similar froth would be approximately 80 minutes and at least 10 batches would be required.

What we claim is:

1. A process of continuously forming a foam of compounded aqueous rubber dispersions which comprises admixing and foaming a mixture of aqueous rubber dispersion and air, and continuously beating compounding ingredients into the continuous stream of foamed rubber dispersion thus formed.

2. A process for continuously foaming a foam of compounded aqueous dispersions of rubber which comprises continuously admixing air and an aqueous dispersion of rubber, and beating the mixture to form a continuous stream of foamed aqueous dispersion of rubber of predetermined fineness, admixing compounding and gelling materials into said continuous stream of foamed aqueous dispersion in a predetermined proportion thereto, and stirring said added ingredients into said continuous stream of foam.

EDWARD ARTHUR MURPHY.
EVELYN WILLIAM MADGE.
STANLEY DOUGLAS TAYLOR.
DONALD WHITWORTH POUNDER.